(12) United States Patent
Williams et al.

(10) Patent No.: US 11,583,144 B1
(45) Date of Patent: Feb. 21, 2023

(54) MICRO PUREE MACHINE WITH PARTIAL DEPTH PROCESSING

(71) Applicant: SharkNinja Operating LLC, Needham, MA (US)

(72) Inventors: Helen Williams, London (GB); Sam Bannister, London (GB); Lukas Tubby, Needham, MA (US); Ryan Michienzi, Needham, MA (US); Max He, Needham, MA (US); Ping Chu, Needham, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

(21) Appl. No.: 17/829,955

(22) Filed: Jun. 1, 2022

Related U.S. Application Data

(63) Continuation of application No. 17/747,102, filed on May 18, 2022.

(51) Int. Cl.
    *A47J 43/044*     (2006.01)
    *A47J 43/07*     (2006.01)
    *A47J 43/08*     (2006.01)

(52) U.S. Cl.
    CPC ......... *A47J 43/0705* (2013.01); *A47J 43/044* (2013.01); *A47J 43/0727* (2013.01); *A47J 43/0755* (2013.01); *A47J 43/082* (2013.01); *A47J 2043/0449* (2013.01)

(58) Field of Classification Search
    CPC .. A47J 43/0705; A47J 43/044; A47J 43/0755; A47J 43/082; A47J 43/046; A47J 43/0465; B02C 25/00
See application file for complete search history.

(56) References Cited

U.S. PATENT DOCUMENTS

| | | | |
|---|---|---|---|
| 2,472,188 A | 6/1949 | Clark et al. |
| 2,565,226 A | 8/1951 | Gross, Jr. |
| 3,505,075 A | 4/1970 | Black |
| 4,183,680 A | 1/1980 | Manfroni |

(Continued)

FOREIGN PATENT DOCUMENTS

| CN | 87201657 | 2/1988 |
|---|---|---|
| CN | 1032121 | 4/1989 |

(Continued)

OTHER PUBLICATIONS

Extended European Search Report in Application No. 22185058.9 dated Dec. 14, 2022 (7 pgs).

*Primary Examiner* — Faye Francis
(74) *Attorney, Agent, or Firm* — Burns & Levinson, LLP; Joseph M. Maraia; Marlo Schepper Grolnic

(57) ABSTRACT

A micro puree machine includes a mixing shaft coupled to a blade and rotatable by means of a gear. A magnet is coupled to the gear and a rotation sensor is mounted on the machine housing. As the mixing shaft descends into the pre-frozen ingredients, the rotation sensor detects a magnetic field of the magnet as the gear rotates and generates a rotation signal in response. A controller receives the rotation signal and determines a rotation count associated with the gear, causing the mixing shaft to ascend back toward the housing once a pre-selected rotation count has been reached. The pre-selected rotation count correlates with the partial processing of the ingredients.

18 Claims, 8 Drawing Sheets

(56) References Cited

U.S. PATENT DOCUMENTS

| | | | |
|---|---|---|---|
| 4,547,076 | A | 10/1985 | Maurer |
| 4,701,054 | A | 10/1987 | Cipelletti |
| 4,930,709 | A | 6/1990 | Steffens |
| 5,803,377 | A | 9/1998 | Farrell |
| 6,394,373 | B1 | 5/2002 | Morris |
| 6,474,862 | B2 | 11/2002 | Farrell |
| 6,772,675 | B2 | 8/2004 | Ervin |
| 7,621,476 | B2 | 11/2009 | Jakobi et al. |
| 8,794,133 | B2 | 8/2014 | Fister et al. |
| 9,004,608 | B1 | 4/2015 | Charbonneau |
| 9,149,156 | B2 | 10/2015 | Rosenzweig et al. |
| 9,357,883 | B2 | 6/2016 | Lee et al. |
| 10,443,917 | B2 | 10/2019 | Kim |
| 10,743,561 | B2 | 8/2020 | Smith |
| 10,874,132 | B2 | 12/2020 | Nortey et al. |
| 11,154,163 | B1 | 10/2021 | He et al. |
| 2005/0086814 | A1 | 4/2005 | Huang |
| 2005/0167537 | A1 | 8/2005 | Chen |
| 2005/0183426 | A1 | 8/2005 | Learned |
| 2007/0297282 | A1 | 12/2007 | Procuranti |
| 2012/0189746 | A1 | 7/2012 | DeLong |
| 2014/0252146 | A1 | 9/2014 | Audette et al. |
| 2015/0174586 | A1 * | 6/2015 | Lipowski ............ B02C 18/0084 241/36 |
| 2015/0272394 | A1 | 10/2015 | Lin |
| 2015/0308062 | A1 | 10/2015 | Charbonneau |
| 2015/0308063 | A1 | 10/2015 | Charbonneau |
| 2016/0045073 | A1 | 2/2016 | Kozlowski et al. |
| 2018/0213980 | A1 | 8/2018 | Cody et al. |
| 2021/0039609 | A1 | 2/2021 | Wangler et al. |
| 2021/106958 | A1 | 4/2021 | Medici |
| 2021/0274974 | A1 | 9/2021 | Abraham et al. |
| 2022/0142409 | A1 | 5/2022 | Beckstrom et al. |
| 2022/0225830 | A1 | 7/2022 | Verbugge et al. |

FOREIGN PATENT DOCUMENTS

| | | | | |
|---|---|---|---|---|
| CN | 2684699 | | 3/2005 | |
| CN | 1933910 | | 3/2007 | |
| CN | 201404045 | | 2/2010 | |
| CN | 201414376 | | 3/2010 | |
| CN | 101889623 | | 11/2010 | |
| CN | 102078149 | A | 6/2011 | |
| CN | 201987368 | U | 9/2011 | |
| CN | 102605735 | | 7/2012 | |
| CN | 102655794 | | 9/2012 | |
| CN | 202408593 | | 9/2012 | |
| CN | 202819518 | | 3/2013 | |
| CN | 202890392 | | 4/2013 | |
| CN | 103168908 | | 6/2013 | |
| CN | 103190520 | | 7/2013 | |
| CN | 203152409 | | 8/2013 | |
| CN | 203152410 | | 8/2013 | |
| CN | 203174549 | | 9/2013 | |
| CN | 103480470 | | 1/2014 | |
| CN | 203608787 | | 5/2014 | |
| CN | 203801633 | | 9/2014 | |
| CN | 204520414 | | 8/2015 | |
| CN | 105214552 | | 1/2016 | |
| CN | 205308187 | | 6/2016 | |
| CN | 105815531 | | 8/2016 | |
| CN | 205585245 | | 9/2016 | |
| CN | 207220039 | U | 9/2017 | |
| CN | 206620790 | U | 11/2017 | |
| CN | 206761571 | | 12/2017 | |
| CN | 206761572 | | 12/2017 | |
| CN | 206761573 | | 12/2017 | |
| CN | 206761574 | | 12/2017 | |
| CN | 108991950 | | 12/2018 | |
| CN | 109123054 | | 1/2019 | |
| CN | 109195695 | A * | 1/2019 | ............ A47J 43/04 |
| CN | 208523680 | | 2/2019 | |
| CN | 209171342 | | 7/2019 | |
| CN | 211091708 | | 7/2020 | |
| CN | 211739597 | | 10/2020 | |
| CN | 112041094 | | 12/2020 | |
| CN | 112312806 | A * | 2/2021 | ............ A47J 31/401 |
| CN | 213454405 | | 6/2021 | |
| CN | 213793253 | | 7/2021 | |
| CN | 214250243 | | 9/2021 | |
| CN | 215638179 | | 1/2022 | |
| DE | 102018119811 | A1 * | 6/2019 | ............ A47J 43/085 |
| EP | 0161679 | | 11/1985 | |
| EP | 0308666 | | 3/1989 | |
| EP | 1156735 | B1 | 11/2001 | |
| EP | 1680228 | | 7/2006 | |
| EP | 2335535 | | 6/2011 | |
| EP | 2512312 | | 10/2012 | |
| EP | 2820987 | A1 * | 1/2015 | ......... A47J 43/0716 |
| EP | 3369353 | A1 | 9/2018 | |
| EP | 3787808 | | 3/2021 | |
| ES | 1071424 | U | 3/2010 | |
| ES | 1071426 | U | 8/2011 | |
| KR | 20130004981 | U * | 7/2013 | ............ A47J 43/07 |
| WO | 1997/036498 | A1 | 10/1997 | |
| WO | WO2005072879 | | 8/2005 | |
| WO | WO2011073873 | | 6/2011 | |
| WO | WO-2011113970 | A1 * | 9/2011 | ......... A47J 43/0465 |
| WO | WO2017166008 | | 10/2017 | |
| WO | WO-2018007833 | A1 * | 1/2018 | ............ A47J 43/04 |
| WO | WO2018085369 | | 5/2018 | |
| WO | WO2018223555 | | 12/2018 | |
| WO | 2019/200490 | A1 | 10/2019 | |
| WO | 2019/200491 | A1 | 10/2019 | |
| WO | WO2019210934 | | 11/2019 | |
| WO | 2022/020653 | A1 | 1/2022 | |

* cited by examiner

11,583,144 B1

MICRO PUREE MACHINE WITH PARTIAL DEPTH PROCESSING

CROSS-REFERENCE TO RELATED APPLICATIONS

This application is a continuation of U.S. application Ser. No. 17/747,102, filed May 18, 2022, entitled MICRO PUREE MACHINE WITH PARTIAL DEPTH PROCESSING, the entire contents of which are incorporated herein by reference for all purposes.

FIELD OF THE INVENTION

The present disclosure relates to a food processing device and, more particularly, to a micro puree machine having a computer-implemented feature for processing a preselected portion of the ingredients.

BACKGROUND

Home use machines intended to make ice creams, gelatos, frozen yogurts, sorbets and the like are known in the art. Typically, a user adds a series of non-frozen ingredients to a bowl. The ingredients are then churned by a paddle while a refrigeration mechanism simultaneously freezes the ingredients. These devices have known shortcomings including, but not limited to, the amount of time and effort required by the user to complete the ice cream making process. Machines of this nature are also impractical for preparing most non-dessert food products.

An alternative type of machine known to make a frozen food product is a micro-puree machine. Typically, machines of this nature spin and plunge a blade into an ingredient or a combination of ingredients pre-frozen within a container. While able to make frozen desserts like ice creams, gelatos, frozen yogurts, sorbets and the like, micro puree style machines can also prepare non-dessert types of foods such as non-dessert purees and mousses. In addition, a user can prepare either the entire batch of ingredients or a pre-desired number of servings.

With some current micro puree machines, consumers can only process an entire container of pre-frozen ingredients at once. If the consumer processes, but does not consume, the full container of ingredients in a single sitting, the consumer can re-freeze the container and reprocess the remaining ingredients later. However, refreezing and reprocessing the ingredients may compromises the culinary quality of finished dessert.

SUMMARY

This disclosure describes a micro puree machine with a processing feature that gives consumers the ability to process only a preselected portion of their pre-frozen ingredients when the consumer does not wish to process all of the ingredients at once. The micro puree machine includes a mixing shaft coupled to a blade and rotatable by means of a gear. In some embodiments, a magnet is coupled to the gear and a rotation sensor is mounted on the machine housing. As the mixing shaft descends into the pre-frozen ingredients, the rotation sensor detects a magnetic field of the magnet as the gear rotates and generates a rotation signal in response. In such embodiments, a controller receives the rotation signal and determines a rotation count associated with the gear, causing the mixing shaft to ascend back toward the housing once a pre-selected rotation count has been reached. The pre-selected rotation count correlates with the partial processing of the ingredients. Advantageously, the processing feature allows the consumer to process only a portion of the ingredients and refreeze the remaining portion for processing at another time without compromising the culinary quality of the ingredients.

Embodiments of the micro puree machine of this disclosure may include one or more of the following, in any suitable combination.

In embodiments, a micro puree machine of this disclosure includes a position motor housed within a housing of a micro-puree machine. The position motor is operable to change a position of a mixing shaft via rotation of a gear. A sensor on the housing is configured to detect a property associated with a position of the shaft and, in response to the detection, generate a first signal indicative of the property. The micro puree machine also includes a controller comprising a processing unit. The controller is configured to receive the first signal from rotation sensor and determine the current position of the mixing shaft based on the first signal.

In additional embodiments, the micro puree machine further includes a magnet coupled to the gear. The sensor is configured to detect a magnetic field of the magnet as the gear rotates and when the magnet is in proximity to the sensor. The controller is further configured to determine a rotation count associated with the gear based on the signal and determine the current position based on the determined rotation count. In embodiments, the controller is further configured to receive a target position for the mixing shaft, activate the position motor to move the mixing shaft in a first direction toward the target position, compare the current determined position of the mixing shaft with the target position, and deactivate the position motor when the determined position is substantially equal to the target position. In embodiments, the micro puree machine further includes a user interface, and the target position is at least one of predetermined and based on a user input. In embodiments, the controller further includes a memory having a lookup table that correlates a plurality of rotation counts with a plurality of positions of the mixing shaft. In embodiments, the target position includes a predetermined depth of the mixing shaft within a beaker connected to the micro puree machine. In embodiments, the controller is further configured to receive a size signal associated with a beaker connected to the micro puree machine and, in response, select the target position.

In yet further embodiments, the micro puree machine further includes a beaker sensor configured to determine a size of a beaker connected to the micro puree machine and output a size signal. In embodiments, the controller is further configured to change the position of mixing shaft in a first direction and a second opposite direction. In embodiments, the first direction is a substantially descending direction and the second direction is a substantially ascending direction. In embodiments, the rotation sensor is a Hall effect sensor. In embodiments, the micro puree machine further includes a drive motor offset from vertical alignment with the mixing shaft. In embodiments, the drive motor is operable to rotate the mixing shaft in both a clockwise direction and a counterclockwise direction. In embodiments, the housing includes an upper housing, and the position motor is housed within the upper housing.

Embodiments of a food processor shaft position control system of this disclosure include a position motor housed within a housing of a micro-puree machine. The position motor is operable to change a position of a mixing shaft via rotation of a gear. A sensor on the housing is configured to detect a property associated with a position of the shaft and, in response to the detection, generate a first signal indicative of the property. The position control system also includes a controller comprising a processing unit. The controller is configured to receive the first signal from rotation sensor and determine the current position of the mixing shaft based on the first signal.

In additional embodiments, the position control system further includes a magnet coupled to the gear. The sensor is configured to detect a magnetic field of the magnet as the gear rotates and when the magnet is in proximity to the sensor. The controller is further configured to determine a rotation count associated with the gear based on the signal and determine the current position based on the determined rotation count. In embodiments, the position control system is further configured to receive a target position for the shaft, activate the position motor to move the shaft in a first direction toward the target position, compare the determined current position of the shaft with the target position, and deactivate the position motor when the determined position is substantially equal to the target position. In embodiments, the food processor further includes a user interface, and the target position is at least one of predetermined and based on a user input. In embodiments, the target position includes a predetermined depth of the shaft within a beaker connected to the food processor.

Embodiments of a method for manufacturing a shaft position controller of a food processor of this disclosure include housing a position motor and gear within a housing of the food processor. The position motor is operable to change a position of the shaft via rotation of the gear. The method also includes providing a sensor in the housing configured to detect a property associated with a position of the shaft and, in response to the detection, generate a first signal indicative of the property. The method also includes providing a controller comprising a processing unit. The controller is configured to receive the first signal from the sensor and determine the current position of the shaft based on the first signal.

A reading of the following detailed description and a review of the associated drawings will make apparent the advantages of these and other features. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

Figure 1:
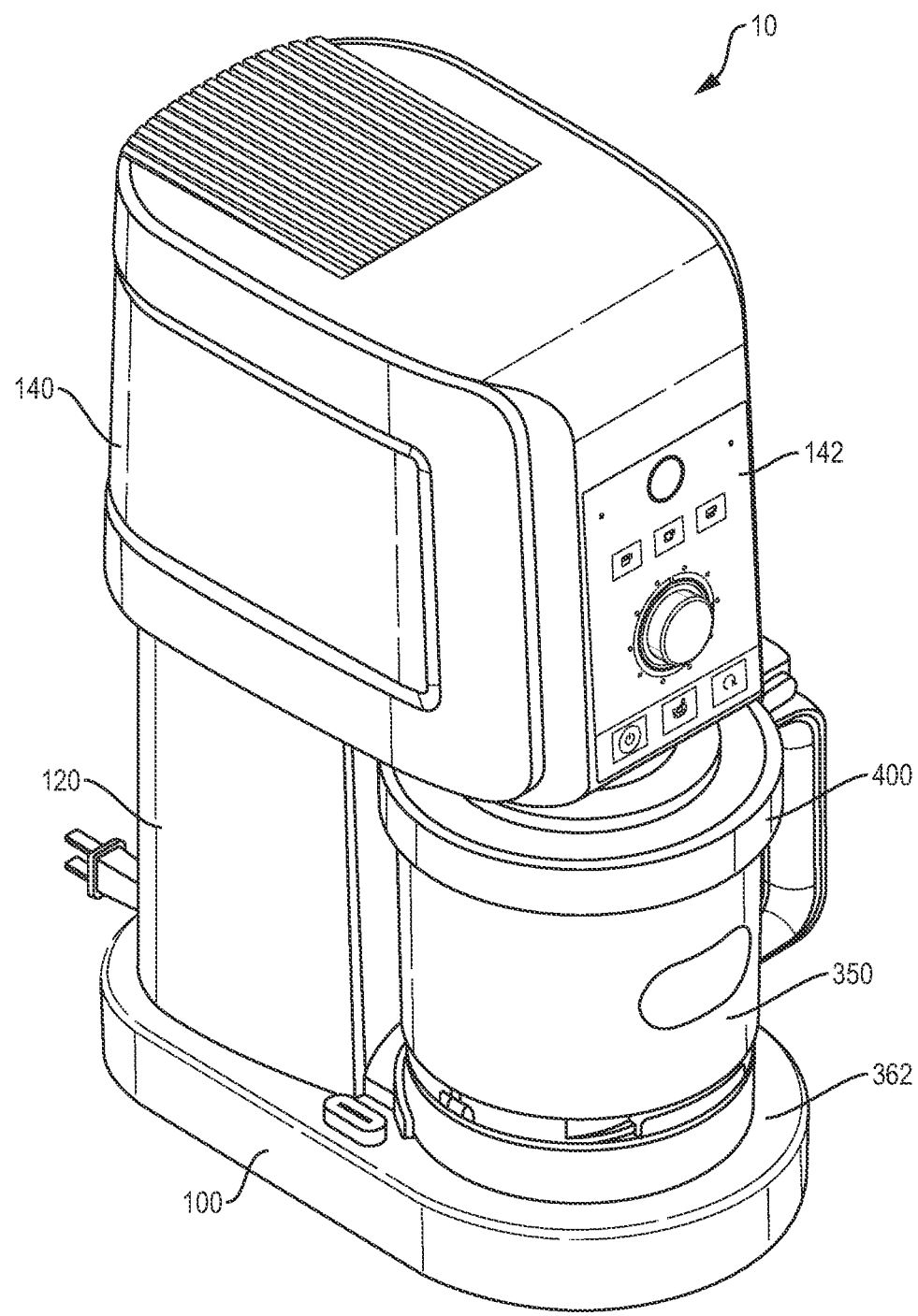
FIGS. 1 and 2 show a micro puree machine of this disclosure according to some embodiments.

In the following description, like components have the same reference numerals, regardless of different illustrated embodiments. To illustrate embodiments clearly and concisely, the drawings may not necessarily reflect appropriate scale and may have certain features shown in somewhat schematic form. The disclosure may describe and/or illustrate features in one embodiment, and in the same way or in a similar way in one or more other embodiments, and/or combined with or instead of the features of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the feed chute assembly in any manner.

FIG. 1 shows an isometric view of a micro puree machine 10 according to an illustrative embodiment of the present disclosure. The micro puree machine 10 may include a lower housing or base 100 and an upper housing 140. A middle housing 120 may extend between the lower housing 100 and upper housing 140. The upper housing 140 may include an interface 142 for receiving user inputs to control the micro puree machine 10 and/or display information. The micro puree machine 10 may also include a removable beaker 350 and a lid 400 coupled to the beaker 350. The beaker 350 may contain one or more pre-frozen ingredients for processing. A user may place the beaker 350 and the lid 400 on the lower housing 100. The user then may rotate the beaker 350 and the lid 400 on a lifting platform 362 from a down position to an up position, and vice versa.

Figure 2:
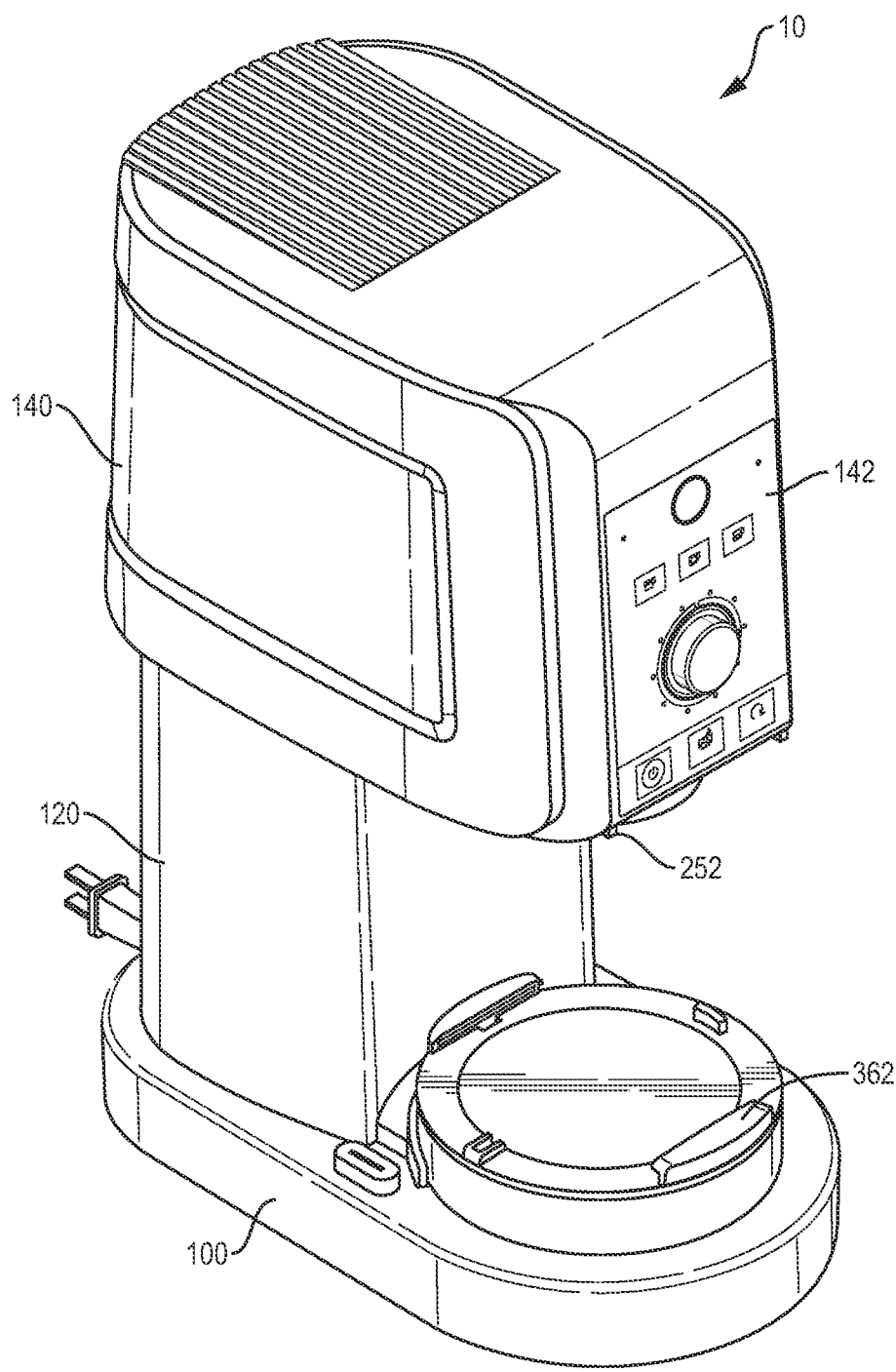

FIG. 2 shows the micro puree machine 10 of FIG. 1 with the beaker 350 removed for ease of illustration. When the user raises the beaker 350 and the lid 400 vertically to the up position, a blade assembly (not shown) within the lid 400 engages with a mixing shaft 250 extending from the upper housing 140. The mixing shaft 250 delivers a rotational force to the blade assembly to spin one or more blades as they engage with ingredients inside the beaker 350. Further non-limiting embodiments of the micro puree machine 10 are described in U.S. Pat. No. 11,154,163 to SharkNinj a Operating, LLC (Needham, Mass.), the contents of which are incorporated herein by reference in their entirety.

Figure 3A:
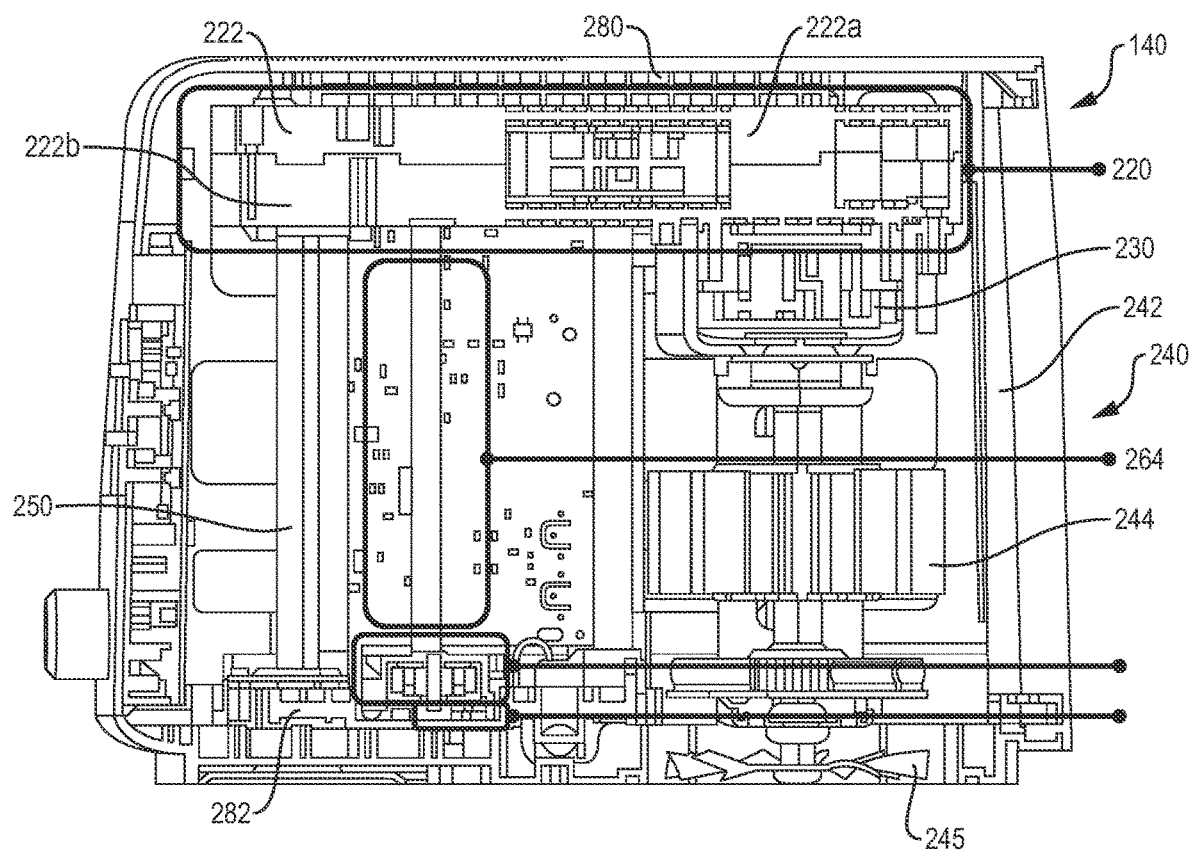
FIG. 3A is a cut-away view of the upper housing of the micro puree machine of FIGS. 1 and 2 according to some embodiments.

FIG. 3A shows a right-side cutaway view of the upper housing 140 of the micro puree machine 10 according to some embodiments. The upper housing 140 includes an upper support 280 and a lower support 282 positioned in the upper housing 140. A vertical threaded rod or lead screw 264 may extend between the upper and lower supports 280, 282. The upper housing 140 may include a chassis 220 and a drive motor assembly 240 connected to the chassis 220. The drive motor assembly 240 may include a drive motor housing 242 and a drive motor 244. The chassis 220 may include a gearbox housing 222 containing a plurality of gears (not shown) for delivering power from the drive motor 244 to the mixing shaft 250. In an illustrative embodiment, the gearbox housing 222 may include upper and lower portions 222a, 222b removably attached together. The drive motor housing 242 may be removably attached to the lower portion 222b of the gearbox housing 222. In other embodiments, the drive motor housing 242 may be formed together with the gearbox housing 222 or at least together with the lower portion 222b of the gearbox housing 222. The micro puree machine 10 may further include a fan 245 on the drive motor 244. In an illustrative embodiment, the drive motor 244 may rotatably connect to a transmission 230. The transmission 230 is operatively connected to the plurality of gears, which then rotates the mixing shaft 250.

Figure 3B:
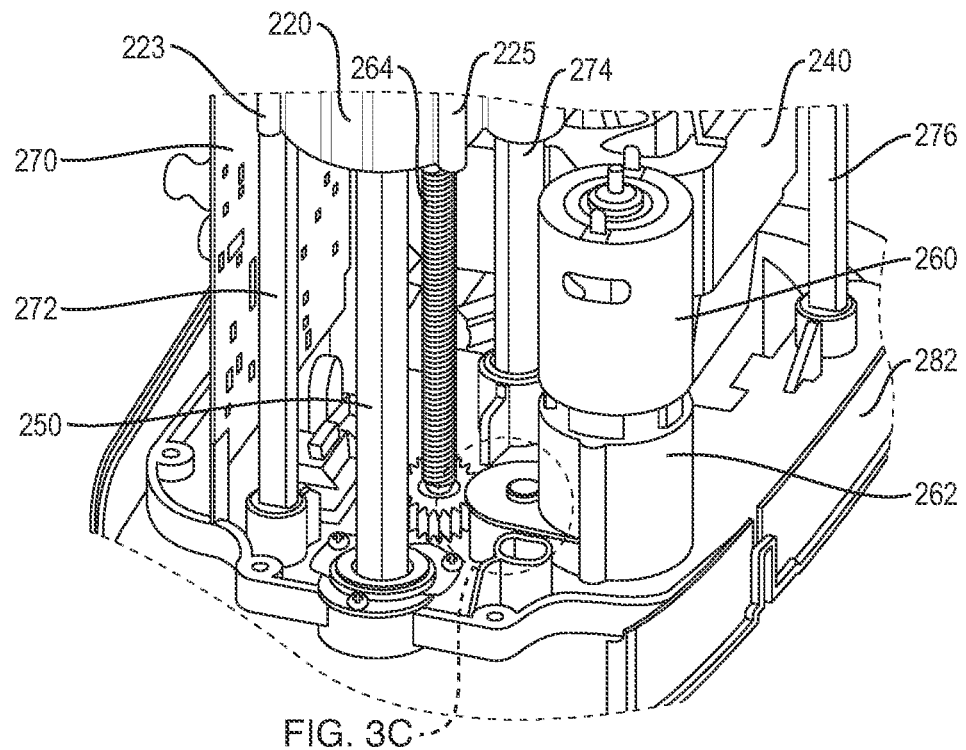
FIG. 3B is an isometric view of the chassis and the position motor of the micro puree machine of FIGS. 1 and 2 according to some embodiments.

FIG. 3B shows an isometric view of the chassis 220 and drive motor assembly 240 of the micro puree machine 10 with surrounding structure according to some embodiments. The chassis 220 and drive motor assembly 240 may slide up and down with respect to the upper and lower supports 280, 282 along a plurality of pillars 272, 274, 276. The pillars 272, 274, 276 and the supports 280, 282 may provide rigidity and concentric alignment of the components. In an illustrative embodiment, the chassis 220 and drive motor assembly 240 may be supported on the pillars 272, 274, 276 via apertures 223, 225 in the gearbox housing 222. The micro puree machine 10 may also include a position motor 260 (e.g., a DC motor) that drives a gearbox 262 including DC drive gear 268. DC drive gear 268 may engage a lead screw gear 284 of the lead screw 264. A rod pitch of the lead screw 264 relates to a vertical decent rate of the chassis 220. Thus, actuation of the position motor 260, either manually via the interface 142 or automatically, may move the chassis 220 and the drive motor assembly 240 up and down. The mixing shaft 250 may move together with the chassis 220, allowing for vertical movement and positioning of the blade assembly attached to the mixing shaft 250 within the beaker 350. The mixing shaft 250, and therefore the blade assembly, may be controlled at different rotational speeds (e.g., via the drive motor 244) and moved up and down (e.g., via the position motor 260) in different patterns and speeds.

Figure 3C:
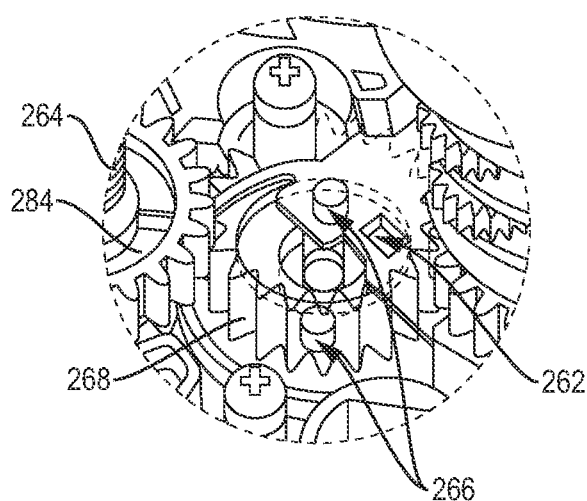
FIG. 3C is a detailed view of a portion of the gearbox of FIG. 3B according to some embodiments.

FIG. 3C shows a detailed view of a portion of the gearbox 262 according to some embodiments. As shown in FIG. 3C, a rotation sensor 254 (e.g., a Hall effect sensor) may be coupled underneath the gearbox 262. One or more magnets 266 may further couple to the DC drive gear 268. The rotation sensor 254 may be configured to detect a magnetic field of the magnets 266 as the DC drive gear 268 rotates and the magnets 266 come into proximity with the sensor 254. In this way, the rotation sensor 254 count revolutions of the DC drive gear 268. In response, the rotation sensor 254 generates a rotation signal to be processed by a controller 400, as further described below.

Figure 4:
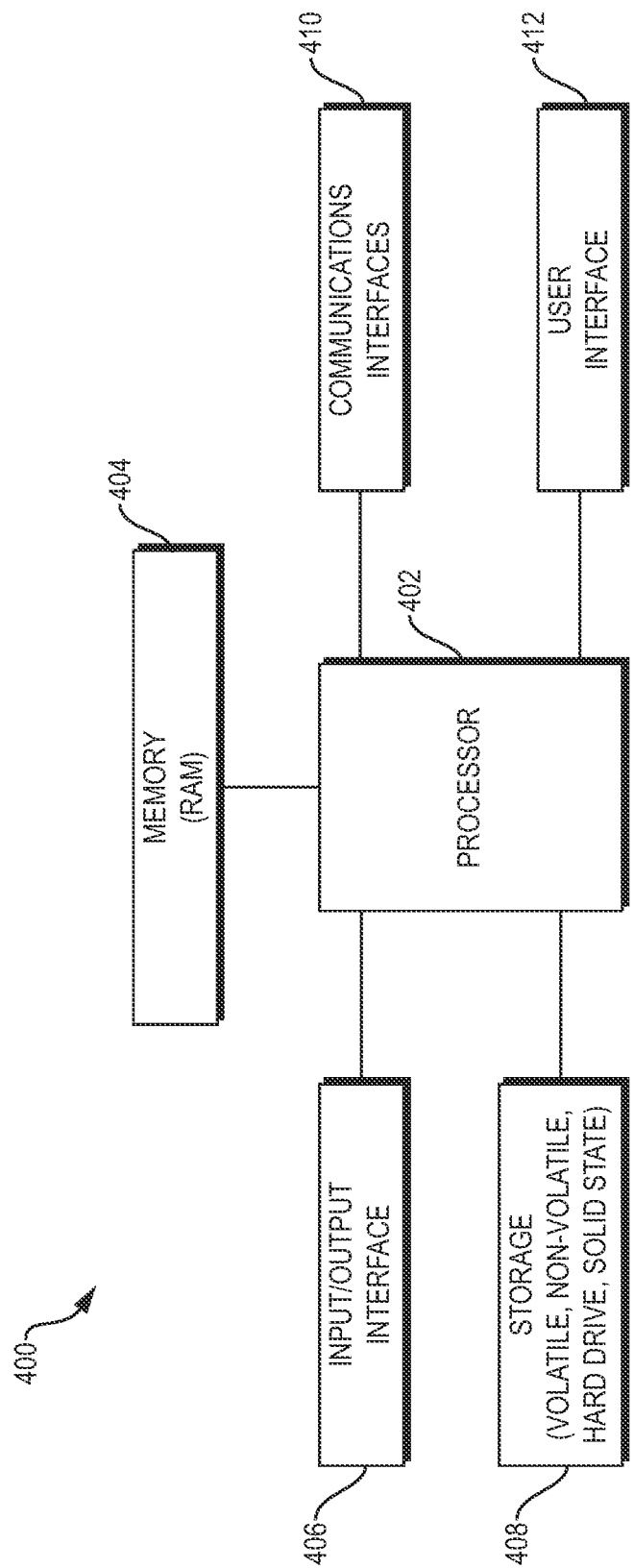
FIG. 4 is a block diagram of a controller of the micro puree machine of FIGS. 1 and 2 according to some embodiments.

FIG. 4 is a block diagram of a controller 400 according to some embodiments of this disclosure. The controller 400 may represent a processing system within the micro puree machine 10. The controller 400 may include a system-on-a-chip (SoC), a client device, and/or a physical computing device and may include hardware and/or virtual processor(s). In some embodiments, the controller 400 and its elements as shown in FIG. 4 each relate to physical hardware and in some embodiments one, more, or all of the elements could be implemented using emulators or virtual machines. Regardless, the controller 400 may be implemented on physical hardware. The controller 400 may include the user interface 142. The controller 400 may also include communications interfaces 410, such as a network communication unit that could include a wired communication component and/or a wireless communications component, which may be communicatively coupled to a processor 402. The network communication unit may utilize any of a variety of proprietary or standardized network protocols, such as Ethernet, TCP/IP, to name a few of many protocols, to effect communications between the processor 402 and another device, network, or system. Network communication units may also comprise one or more transceivers that utilize the Ethernet, power line communication (PLC), Wi-Fi, cellular, and/or other communication methods. The processor 402 may contain one or more hardware processors, where each hardware processor may have a single or multiple processor cores. In an embodiment, the processor 402 includes at least one shared cache that stores data (e.g., computing instructions) that are utilized by one or more other components of the processor 402. For example, the shared cache may be a locally cached data stored in a memory 404 for faster access by components of the processing elements that make up the processor 402. Examples of processors include, but are not limited to, a central processing unit (CPU) and/or microprocessor. The processor 402 may utilize a computer architecture base on, without limitation, the Intel® 8051 architecture, Motorola® 68HCX, Intel® 80X86, and the like. The processor 402 may include, without limitation, an 8-bit, 12-bit, 16-bit, 32-bit, or 64-bit architecture. Although not illustrated in FIG. 4, the processing elements that make up the processor 402 may also include one or more other types of hardware processing components, such as graphics processing units (GPUs), application specific integrated circuits (ASICs), field-programmable gate arrays (FPGAs), and/or digital signal processors (DSPs).

Still referring to FIG. 4, the memory 404 may be operatively and communicatively coupled to the processor 402. The memory 404 may be a non-transitory medium configured to store various types of data. For example, the memory 404 may include one or more storage devices 408 that include a non-volatile storage device and/or volatile memory. Volatile memory, such as random-access memory (RAM), can be any suitable non-permanent storage device. The non-volatile storage devices 408 may include one or more disk drives, optical drives, solid-state drives (SSDs), tape drives, flash memory, read-only memory (ROM), and/or any other type memory designed to maintain data for a duration time after a power loss or shut down operation. In certain configurations, the non-volatile storage devices 408 may be used to store overflow data if allocated RAM is not large enough to hold all working data. The non-volatile storage devices 408 may also be used to store programs that are loaded into the RAM when such programs are selected for execution. Persons of ordinary skill in the art are aware that software programs may be developed, encoded, and compiled in a variety of computing languages for a variety of software platforms and/or operating systems and subsequently loaded and executed by the processor 402. In one embodiment, the compiling process of the software program may transform program code written in a programming language to another computer language such that the processor 402 is able to execute the programming code. For example, the compiling process of the software program may generate an executable program that provides encoded instructions (e.g., machine code instructions) for the processor 402 to accomplish specific, non-generic, particular computing functions. After the compiling process, the encoded instructions may be loaded as computer executable instructions or process steps to the processor 402 from the non-volatile storage device 408, from the memory 404, and/or embedded within the processor 402 (e.g., via a cache or on-board ROM). The processor 402 may be configured to execute the stored instructions or process steps in order to perform instructions or process steps to transform the micro puree machine 10 into a non-generic, particular, specially programmed machine or apparatus. Stored data, e.g., data stored by the non-volatile storage device 408, may be accessed by the processor 402 during the execution of computer executable instructions or process steps to instruct one or more components within the controller 400 and/or other components or devices external to the controller 400.

Still referring to FIG. 4, the user interface 142 can include a display, positional input device (such as a mouse, touch-pad, touchscreen, or the like), keyboard, keypad, one or more buttons, or other forms of user input and output devices such as displays, speakers for audio, LED indicators, and/or light indicators. The components of the user interface 142 may be communicatively coupled to the processor 402. When the user interface output device is or includes a display, the display can be implemented in various ways, including by a liquid crystal display (LCD) or a cathode-ray tube (CRT) or light emitting diode (LED) display, such as an OLED display. Input/Output Interface 406 may interface with one or more sensors that detect and/or monitor environmental conditions within or surrounding controller 400. Environmental conditions may include, without limitation, magnetic field level, rotation and/or movement of a device or component, temperature, pressure, acceleration, vibration, motion, radiation level, position or the device or component, and/or the presence of a device or component. Persons of ordinary skill in the art are aware that the controller 400 may include other components well known in the art, such as power sources and/or analog-to-digital converters, not explicitly shown in FIG. 4. In some embodiments, the controller 400 and/or the processor 402 includes the SoC having multiple hardware components, including but not limited to: a microcontroller, microprocessor or digital signal processor (DSP) core and/or multiprocessor SoCs (MPSoC) having more than one processor cores; memory blocks including a selection of read-only memory (ROM), random access memory (RAM), electronically erasable programmable read-only memory (EEPROM) and flash memory; timing sources including oscillators and phase-docked loops; peripherals including counter-timers, real-time timers and power-on reset generators; external interfaces, including industry standards such as universal serial bus (USB), FireWire, Ethernet, universal synchronous/asynchronous receiver/transmitter (USART), serial peripheral interface (SPI); analog interfaces including analog-to-digital converters (ADCs) and digital-to-analog converters (DACs); and voltage regulators and power management circuits. A SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB). Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some embodiments, some or all of the components of the controller 400 are implemented on the PCB 270 (FIG. 3).

Figure 5:
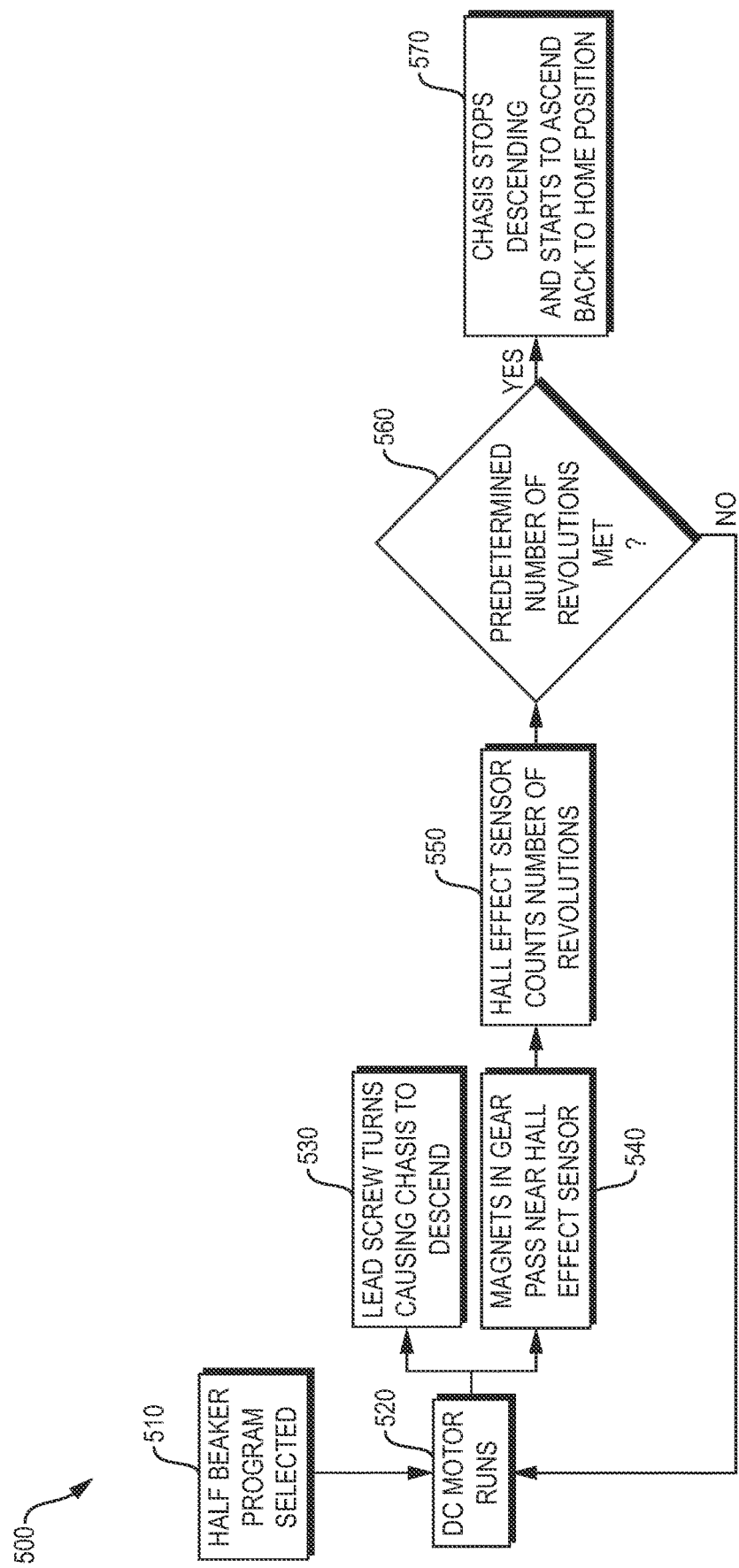
FIG. 5 is a flowchart of a method of implementing a computer program in the micro puree machine of FIGS. 1 and 2 according to some embodiments.

FIG. 5 is a flowchart of a method of implementing a computer program 500 using the controller 400 of the micro puree machine 10 according to some embodiments. Initially, a user may select the computer program 500 for processing only a portion (e.g., half) of the ingredients in the beaker 350 at the user interface 142 (step 510). Selecting the program 500 causes the controller 400 to turn on the position motor 262 (step 520). The lead screw 264 then begins to rotate, and the chassis 220 and the mixing shaft 250 descend toward the beaker 350 to a target position (step 530). As the DC drive gear 268 turns, the magnets 266 in the DC drive gear 268 pass in proximity to the rotation sensor 254 (step 540). The rotation sensor 254 counts the number of rotations of the DC drive gear 268 (step 550), comparing the rotation count with a plurality of rotation counts in a lookup table stored in the memory 404 (step 560). The lookup table correlates the plurality of rotation counts with a plurality of positions of the mixing shaft 250. If the predetermined number of rotations has not been met, the position motor 262 continues to run until the target position is met. Once the predetermined number of rotations is met, the chassis 220 stops descending towards the beaker 350 and begins ascending back to its starting position (step 570).

Figure 6:
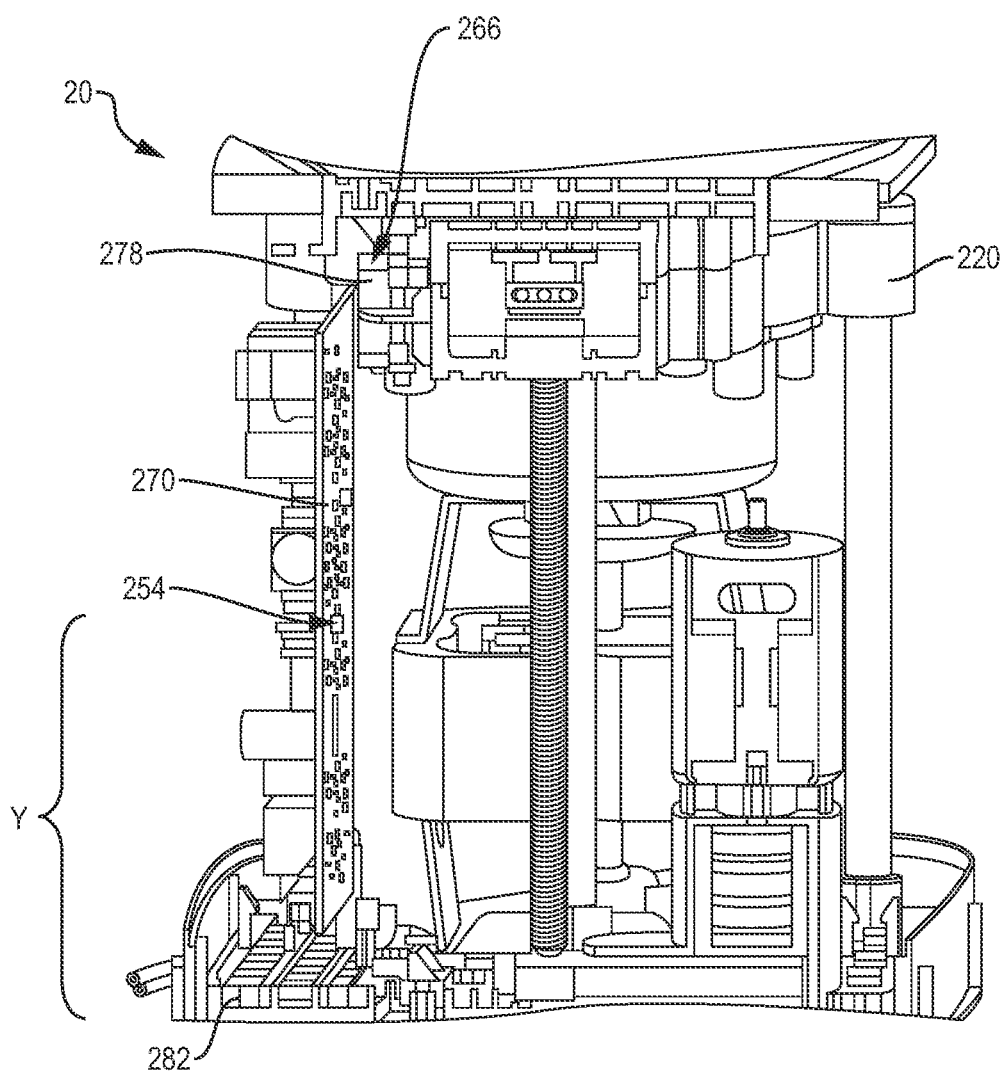
FIG. 6 shows an alternative embodiment of the micro puree machine of this disclosure.

FIG. 6 shows an alternative embodiment of the micro puree machine 20 of this disclosure. In FIG. 6, the rotation sensor 254 is mounted on the PCB 270 at a pre-selected height Y with respect to the lower support 282. The magnet 266 is mounted on an AC drive gear 278 within the chassis 220. The pre-selected height Y of the rotation sensor 254 corresponds to a partial processing point of the mixing shaft 250. This arrangement of the rotation sensor 254 and magnet 266 provides a single, fixed position for determining when a desired portion of the ingredients in the beaker 350 have been processed. As the gearbox 278 descends with the chassis 220 past the predetermined processing point, the magnet 266 and the rotation sensor 254 engage, causing the controller 400 to end the descent.

Figure 7:
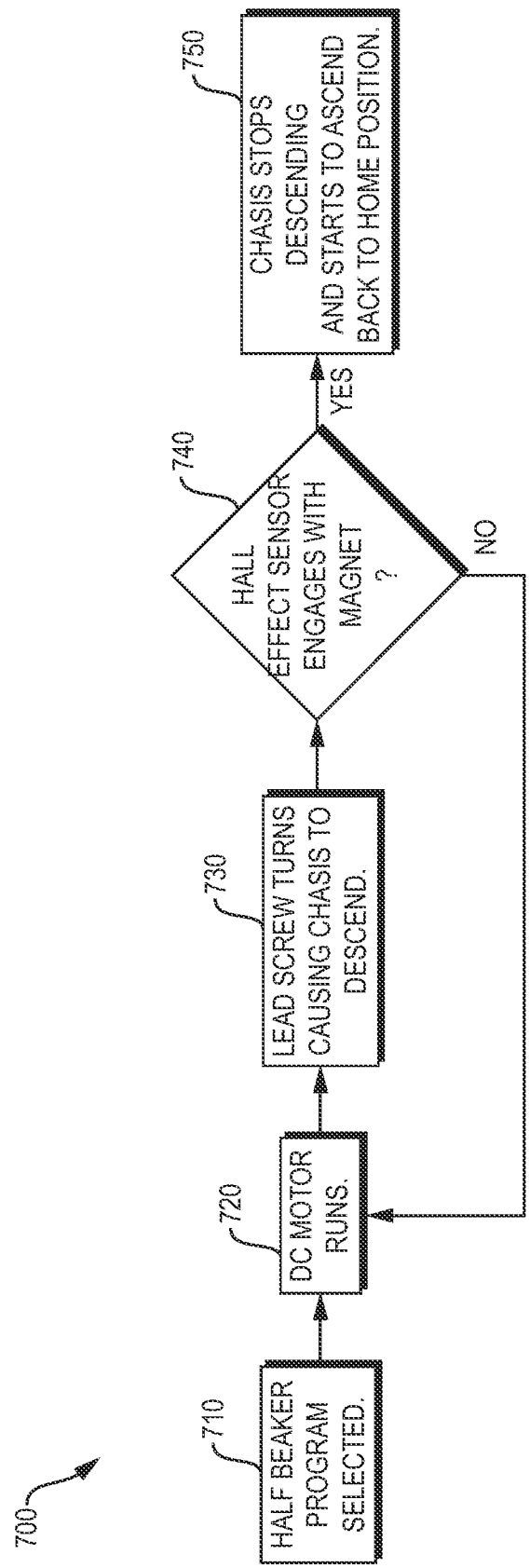
FIG. 7 is a flowchart of a method of implementing a computer program in the micro puree machine of FIG. 6 according to some embodiments.

FIG. 7 is a flowchart of a method of implementing a computer program 700 using the controller 400 of the micro puree machine 20 according to some embodiments. Initially, a user may select the computer program 700 for processing only a portion (e.g., half) of the ingredients in the beaker 350 at the user interface 142 (step 710). Selecting the program 700 causes the controller 400 to turn on the position motor 262 (step 720). The lead screw 264 then begins to rotate, and the chassis 220 and the mixing shaft 250 descend toward the beaker 350 to a target position (step 730). As the chassis descends, the magnet 266 in the AC drive gear 278 pass by the rotation sensor 254 on the PCB 270 (step 740). When the magnet 266 reaches a certain range of the rotation sensor 254, the rotation sensor 254 picks up the rotation signal and feeds it back to the controller 400 to stop the descent of the chassis 220 and return the chassis 220 to the home position (step 750).

The disclosure also contemplates that the controller 400 may be further configured to receive a size signal associated with the beaker 350 and, in response, select the target position. The micro puree machine 10 may further include a beaker sensor (not shown) configured to determine a size of the beaker 350 and output a size signal.

It will be apparent to those of ordinary skill in the art that certain aspects involved in the operation of controller 400 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon. While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

We claim:

1. A micro puree machine comprising:
   a housing;
   a mixing shaft moveable through the housing;
   a blade coupleable to the mixing shaft;
   a position motor housed within the housing, the position motor operable to change a first position of the mixing shaft via rotation of a gear;
   a magnet coupled to the gear;
   a sensor on the housing configured to detect a magnetic field of the magnet as the gear rotates and when the magnet is in proximity to the sensor and, in response to the detection, generate a first signal; and
   a controller comprising a processing unit, the controller configured to:
      receive the first signal from the sensor;
      determine a rotation count associated with the gear based on the first signal; and
      determine the first position of the mixing shaft based on the determined rotation count.

2. The micro puree machine of claim 1, wherein the controller is further configured to:
   receive a target position for the mixing shaft;
   compare the determined first position of the mixing shaft with the target position;
   activate the position motor to move the mixing shaft in a first direction from the first position toward the target position; and
   deactivate the position motor when the mixing shaft is in the target position.

3. The micro puree machine of claim 2, wherein the micro puree machine further comprises a user interface, and wherein the target position is at least one of i) predetermined; and ii) based on a user input.

4. The micro puree machine of claim 2, wherein the controller further comprises a memory including a lookup table that correlates a plurality of rotation counts with a plurality of positions of the mixing shaft.

5. The micro puree machine of claim 2, wherein the target position includes a predetermined depth of the mixing shaft within a beaker connected to the micro puree machine.

6. The micro puree machine of claim 2, wherein the controller is further configured to receive a size signal associated with a beaker connected to the micro puree machine and, in response, select the target position.

7. The micro puree machine of claim 1, further comprising a beaker sensor configured to determine a size of a beaker connected to the micro puree machine and output a size signal.

8. The micro puree machine of claim 1, wherein the controller is further configured to change the first position of the mixing shaft in the first direction and in a second opposite direction.

9. The micro puree machine of claim 8, wherein the first direction is a substantially descending direction and the second direction is a substantially ascending direction.

10. The micro puree machine of claim 1, wherein the sensor is a Hall effect sensor.

11. The micro puree machine of claim 1, further comprising a drive motor offset from vertical alignment with the mixing shaft.

12. The micro puree machine of claim 11, wherein the drive motor is operable to rotate the mixing shaft in both a clockwise direction and a counterclockwise direction.

13. The micro puree machine of claim 1, wherein the housing includes an upper housing, and the position motor is housed within the upper housing.

14. A position control system for a food processor shaft, the position control system comprising:
   a food processor, the food processor comprising:
      a housing; and
      the food processor shaft moveable through the housing;
   a position motor housed within the housing, the position motor operable to change a first position of the food processor shaft via rotation of a gear;
   a magnet coupled to the gear;
   a sensor on the housing configured to detect a magnetic field of the magnet as the gear rotates and when the magnet is in proximity to the sensor and, in response to the detection, generate a first signal; and
   a controller comprising a processing unit, the controller configured to:
      receive the first signal from the sensor;
      determine a rotation count associated with the gear based on the first signal; and
      determine the first position of the food processor shaft based on the determined rotation count.

15. The position control system of claim 14, wherein the controller is further configured to:
   receive a target position for the food processor shaft;
   compare the determined first position of the food processor shaft with the target position;
   activate the position motor to move the food processor shaft in a first direction from the first position toward the target position; and
   deactivate the position motor when the food processor shaft is in the target position.

16. The position control system of claim 15, wherein the food processor further comprises a user interface, and wherein the target position is at least one of i) predetermined; and ii) based on a user input.

17. The position control system of claim 15, wherein the target position includes a predetermined depth of the food processor shaft within a beaker connected to the food processor.

18. A method for manufacturing a shaft position controller within a food processor, the method comprising:
   providing a food processor comprising a housing;
   housing a position motor and a gear within the housing of the food processor, the position motor operable to change a first position of a shaft via rotation of the gear;
   coupling a magnet to the gear;
   providing a sensor in the housing configured to detect a magnetic field of the magnet as the gear rotates and when the magnet is in proximity to the sensor and, in response to the detection, generate a first signal; and
   providing a controller comprising a processing unit, the controller configured to:
      receive the first signal from the sensor;
      determine a rotation count associated with the gear based on the first signal; and
      determine the first position of the shaft based on the determined rotation count.

\* \* \* \* \*